United States Patent
Czubay et al.

(10) Patent No.: US 7,469,173 B2
(45) Date of Patent: Dec. 23, 2008

(54) VOICE NOTIFICATION SYSTEM FOR A VEHICLE

(75) Inventors: John Czubay, Troy, MI (US); John Proietty, Ferndale, MI (US)

(73) Assignee: Ford Motor Company, Dearborn, MI (US)

( * ) Notice: Subject to any disclaimer, the term of this patent is extended or adjusted under 35 U.S.C. 154(b) by 238 days.

(21) Appl. No.: 11/161,061

(22) Filed: Jul. 21, 2005

(65) Prior Publication Data

US 2006/0020381 A1    Jan. 26, 2006

Related U.S. Application Data

(60) Provisional application No. 60/590,374, filed on Jul. 24, 2004.

(51) Int. Cl.
*G06F 17/00* (2006.01)

(52) U.S. Cl. .............. 701/36; 701/22; 701/29; 701/110; 701/114; 340/460; 340/438; 340/500; 180/65.3; 180/65.5

(58) Field of Classification Search ........ 701/36, 701/22, 29, 110, 114; 340/460, 438, 500, 340/426; 180/65.3, 65.5
See application file for complete search history.

(56) References Cited

U.S. PATENT DOCUMENTS

| | | | | |
|---|---|---|---|---|
| 3,909,842 A | * | 9/1975 | Noji | 340/460 |
| 4,310,825 A | * | 1/1982 | Tsunoda et al. | 340/460 |
| 4,426,691 A | * | 1/1984 | Kawasaki | 369/21 |
| 4,438,422 A | * | 3/1984 | Nojiri et al. | 340/460 |
| 4,533,962 A | * | 8/1985 | Decker et al. | 360/5 |
| 4,839,749 A | * | 6/1989 | Franklin | 360/12 |
| 6,008,723 A | * | 12/1999 | Yassan | 340/438 |
| 6,133,827 A | * | 10/2000 | Alvey et al. | 340/438 |
| 6,213,068 B1 | * | 4/2001 | Hassdenteufel | 123/90.15 |
| 6,407,521 B1 | * | 6/2002 | Raftari et al. | 318/254 |
| 6,427,794 B1 | * | 8/2002 | Raftari et al. | 180/65.3 |
| 6,571,157 B1 | | 5/2003 | Dahlin et al. | |
| 6,586,940 B2 | * | 7/2003 | Asakura et al. | 324/426 |

(Continued)

FOREIGN PATENT DOCUMENTS

DE    19533829 C1    9/1996

(Continued)

OTHER PUBLICATIONS

Search Report under Section 17; Application No. GB0514805.1; Nov. 9, 2005.

(Continued)

*Primary Examiner*—Thomas G. Black
*Assistant Examiner*—Wae Louie
(74) *Attorney, Agent, or Firm*—David B. Kelley; Brooks Kushman P.C.

(57) ABSTRACT

A notification system for a vehicle includes at least a first and a second power source. The notification system also includes a controller that is operable with the first and second power sources and is configured to determine operating modes of the first and second power sources. The controller is also adapted to generate signals that correspond to the operating modes and operating limitations of the vehicle to effect an audible indication in the form of a voice message that may include a vehicle system limitation message for a vehicle operator.

15 Claims, 4 Drawing Sheets

U.S. PATENT DOCUMENTS

| | | | |
|---|---|---|---|
| 6,587,759 B2 * | 7/2003 | Obradovich et al. | 701/1 |
| 6,600,989 B2 * | 7/2003 | Sellnau et al. | 701/110 |
| 6,668,219 B2 | 12/2003 | Hwang et al. | |
| 6,679,346 B2 * | 1/2004 | Raftari et al. | 180/65.3 |
| 6,724,300 B2 | 4/2004 | Miyakoshi et al. | |
| 6,731,206 B2 * | 5/2004 | Yang et al. | 340/500 |
| 6,751,534 B2 * | 6/2004 | Robichaux et al. | 701/22 |
| 6,757,599 B2 | 6/2004 | Nada | |
| 7,057,304 B2 * | 6/2006 | Ueda | 290/40 C |
| 7,188,597 B2 * | 3/2007 | Rodriguez et al. | 123/179.6 |
| 7,269,501 B2 * | 9/2007 | Melzig et al. | 701/114 |
| 2002/0011935 A1 * | 1/2002 | Kim | 340/635 |
| 2002/0082754 A1 * | 6/2002 | Robichaux et al. | 701/22 |
| 2003/0230443 A1 * | 12/2003 | Cramer et al. | 180/65.5 |
| 2004/0210356 A1 | 10/2004 | Wilton et al. | |
| 2005/0035741 A1 * | 2/2005 | Elder et al. | 320/116 |
| 2005/0131603 A1 * | 6/2005 | Liu et al. | 701/36 |
| 2006/0020381 A1 * | 1/2006 | Czubay et al. | 701/36 |
| 2007/0005202 A1 * | 1/2007 | Breed | 701/29 |
| 2007/0067077 A1 * | 3/2007 | Liu et al. | 701/29 |

FOREIGN PATENT DOCUMENTS

| | | |
|---|---|---|
| DE | 20202466 U1 | 5/2002 |
| DE | 202 02 466 U1 | 7/2002 |
| DE | 6007917 T2 | 10/2004 |
| GB | 2 301 497 A | 12/1996 |
| JP | 2004170518 A | 6/2004 |
| WO | WO 01/96146 A1 | 12/2001 |

OTHER PUBLICATIONS

German Office Action, Feb. 15, 2006.

* cited by examiner

VOICE NOTIFICATION SYSTEM FOR A VEHICLE

CROSS-REFERENCE TO RELATED APPLICATIONS

This application claims the benefit of U.S. Provisional Application Ser. No. 60/590,374, filed Jul. 24, 2004, the entire contents of which is hereby incorporated by reference.

BACKGROUND OF THE INVENTION

1. Field of the Invention

The present invention relates to a vehicle driver information system and in particular, a voice notification system and method for informing a vehicle operator of a vehicle's operating modes and operating limitations.

2. Background Art

Multiple powertrain power sources allow a vehicle to operate in unique operating modes should one of the power sources become unable to deliver a nominal amount of power. Such a vehicle may be equipped with control strategies that enable the vehicle to be placed into a limited operating mode should an abnormal condition occur. The limited operating mode would disable one drive source while allowing the other drive source to continue providing motive power to the wheels. In the conventional vehicles, such conditions may be displayed on an instrument panel for viewing by the vehicle operator. In other embodiments, these conditions may be indicated by an audible notification, such as a tone or series of tones that may be heard by the vehicle operator.

Convention driver information systems, however, possess several disadvantages. In particular, such systems may require the vehicle operator to divert attention from operating the vehicle to the instrument panel where a message is displayed. Additionally, the conventional notification systems may not provide a sufficiently clear and understandable indication of the particular condition, nor do they provide the vehicle operator with an indication of how to continue operating the vehicle subsequent to determination of the condition.

The present invention was conceived in view of these and other disadvantages of conventional driver information systems.

SUMMARY OF THE INVENTION

The present invention provides a voice notification system for a vehicle that includes at least a first and a second power source. The system also includes a controller that is operable with the first and second power source and is configured to determine operating modes of the first and second power source. The controller is also adapted to generate signals that correspond to the operating mode and operating limitations of the vehicle to effect an audible indication in the form of a voice message that includes a vehicle system limitation message for a vehicle operator.

The present invention also includes a method of informing a vehicle operator of a vehicle operating condition. The method includes the step of configuring the vehicle to include a first and a second power source. The method also includes determining operating modes of the first and second power sources and determining operating limitations of the vehicle. The method includes generating signals that correspond to the operating modes and operating limitations of the vehicle to effect an audible indication in the form of a voice message.

In one embodiment, the voice message includes a vehicle system limitation message that is audible to the vehicle operator.

BRIEF DESCRIPTION OF THE DRAWINGS

These and other features and advantages of the invention will be apparent from the following detailed description and the appended claims, taken in conjunction with the accompanying drawings, in which:

DETAILED DESCRIPTION OF THE PREFERRED EMBODIMENT(S)

Figure 1:
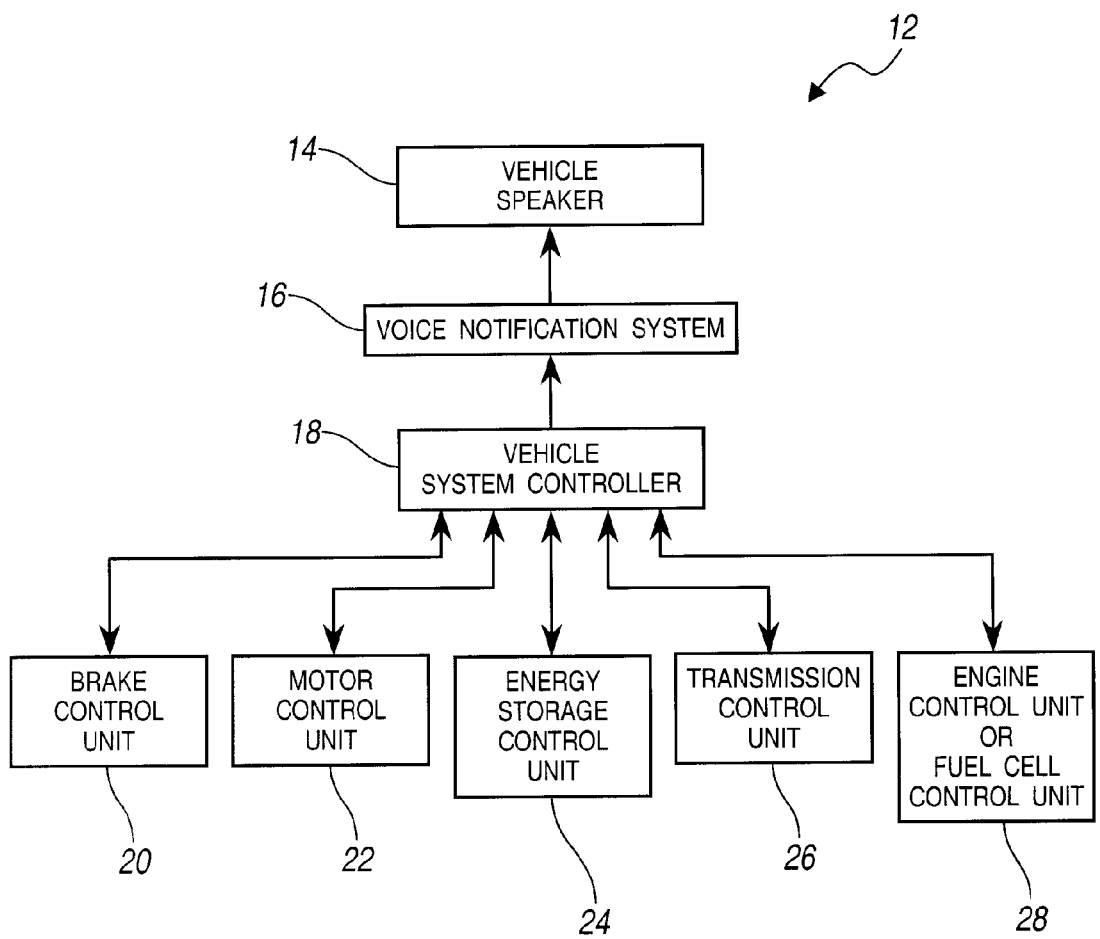
FIG. 1 illustrates a block diagram of a vehicle having a notification system according to an embodiment of the present invention.

Referring to FIG. 1, a vehicle 12 is illustrated that includes a vehicle speaker 14, a voice notification system 16, and a vehicle system controller 18. Vehicle 12 further includes a brake control unit 20, a motor control unit 22, an energy storage control unit 24, a transmission control unit 26, and an engine/fuel cell control unit 28. Alternatively, other power or torque generating sources or systems are possible.

As illustrated by FIG. 1, voice notification system 16 is operable with vehicle speaker 14 and vehicle system controller 18. Vehicle system controller 18 is adapted to monitor control units 20, 22, 24, 26, and 28. Accordingly, vehicle system controller 18 is configured to determine an operating mode of vehicle 12 and accordingly generate signals that correspond to the operating mode for voice notification system 16. As such, voice notification system 16 is configured to generate audible voice messages that are output by vehicle speaker 14. It is recognized that voice notification system 16 and controller 18 may be integrated within a single control module or packaged individually depending upon design and packaging constraints.

In one embodiment, as shown in FIG. 1, vehicle 12 includes multiple power sources. In particular, vehicle 12 includes a motor that is coupled to motor control unit 22, an energy storage system that is coupled to energy storage control unit 24, and an engine or a fuel cell that is coupled to engine/fuel cell control unit 28. As recognized by one of ordinary skill in the art, vehicle 12 may be a hybrid electric vehicle (HEV), a fuel cell electric vehicle (FCEV), or any other vehicle having multiple systems or devices capable of propelling or assisting with propulsion of the vehicle.

When the vehicle systems controller detects an abnormal condition of a power source or component, such as an internal combustion engine (ICE), an energy storage system, or a fuel cell, the vehicle is adapted to enter a limited operating mode. Accordingly, the power source in question is disabled while the remaining functional power sources continue providing motive power to the vehicle wheels. When vehicle system controller 18 determines which power source or component experiences the abnormal condition, controller 18 generates a corresponding signal for voice notification system 16. Voice notification system 16 generates a voice message that indicates the type of failure present in the powertrain system and that informs the driver as to the present operating limitations of the vehicle.

Figure 2A:
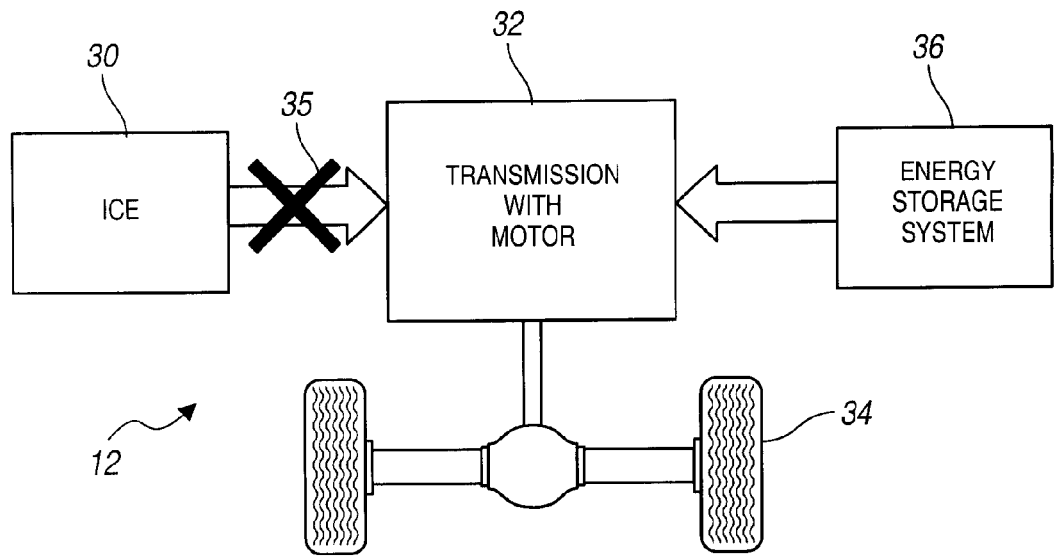
FIGS. 2A-2D illustrate various non-limiting embodiments of a vehicle powertrain architecture upon which the notification system of FIG. 1 is operable.

Now referring to FIGS. 2A-2D, various exemplary powertrain architectures are shown which indicate several possible abnormal power source conditions. The configurations are shown by way of example, and are not intended to limit the scope of the invention. Specifically, FIG. 2A illustrates a HEV powertrain that includes an internal combustion engine 30, a transmission and motor 32, and an energy storage system 36. Energy storage system 36 may be an electrical storage device such as a battery, an ultra-capacitor and the like. Vehicle 12 further includes a set of wheels 34 that are mechanically coupled to the transmission and motor 32. FIG. 2A illustrates an operating mode wherein internal combustion engine 30 is disabled, as indicated by the "X" having numerical label 35. In this architecture, energy storage system 36 is enabled to provide power to transmission and motor 32 for powering vehicle 12.

Figure 2B:
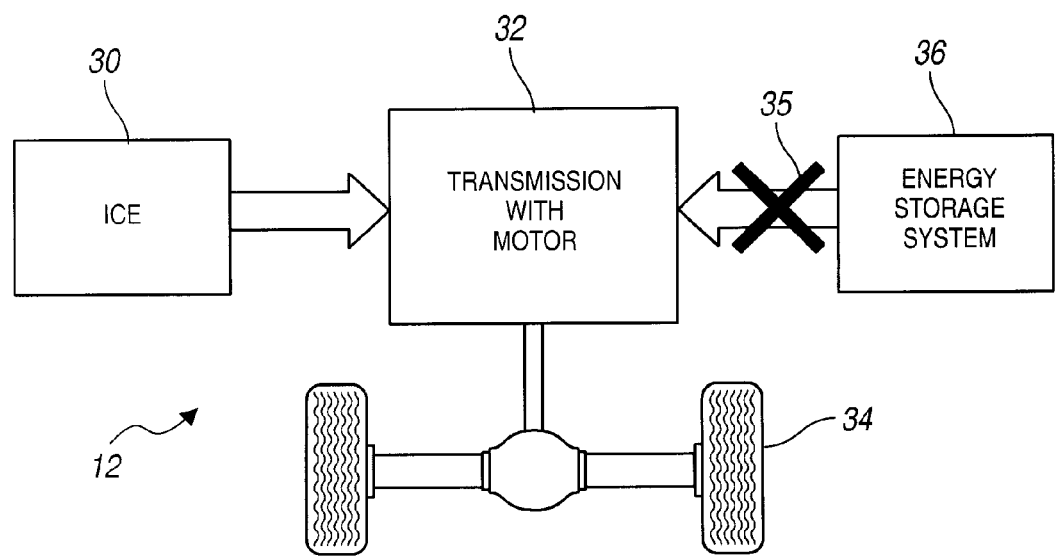

FIG. 2B illustrates a second configuration, wherein energy storage system 36 has been disabled, as indicated by "X" 35. In this example, internal combustion engine 30 operates as the primary power source for vehicle 12.

Figure 2C:
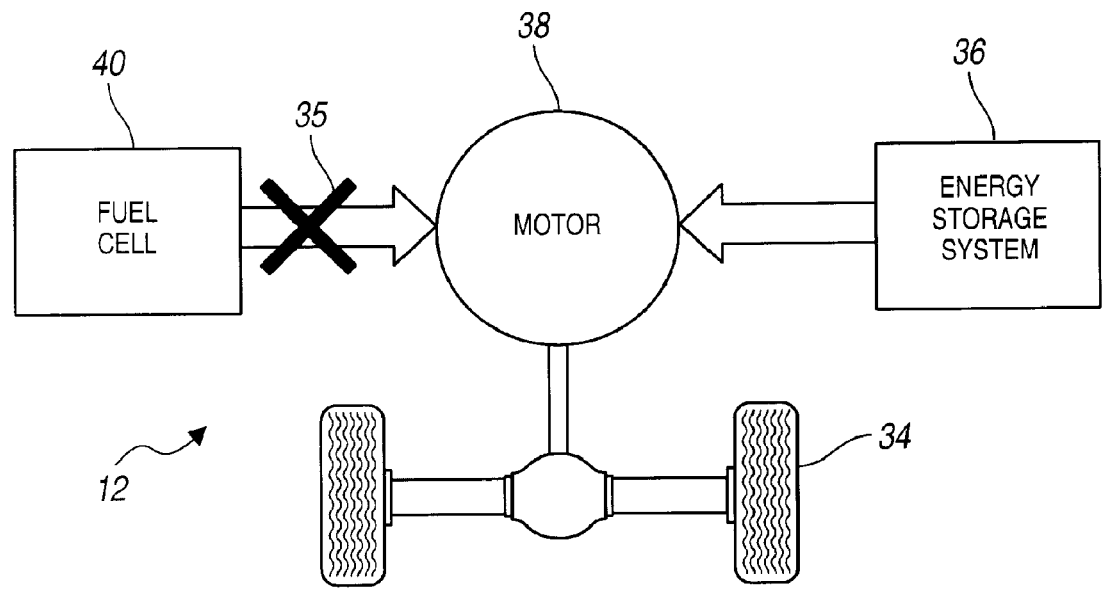
Figure 2D:
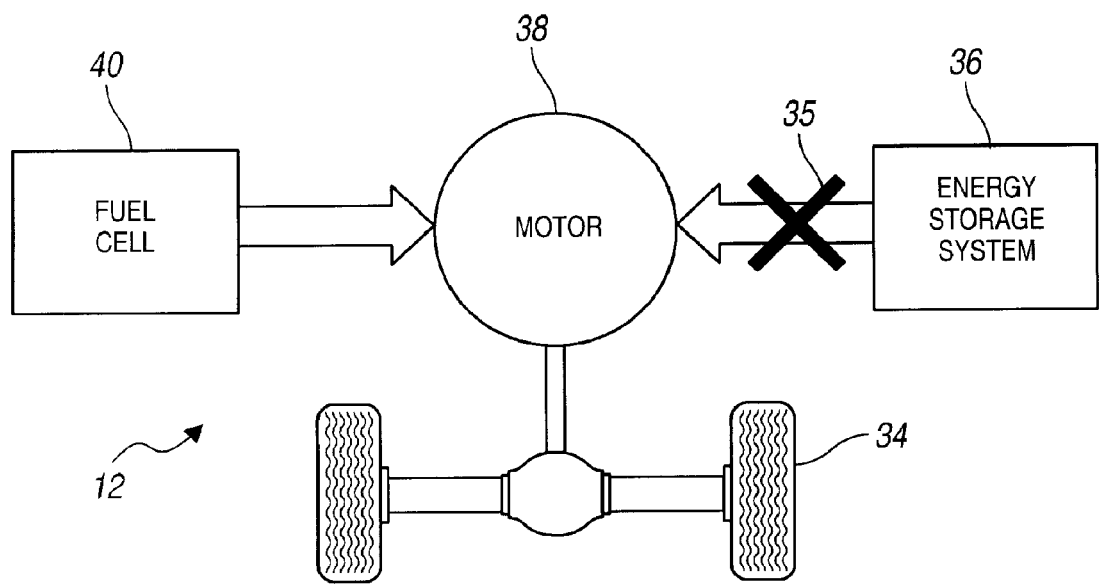

Now referring to FIGS. 2C and 2D, an alternative architecture is shown that illustrates a fuel cell electric vehicle (FCEV). As such, vehicle 12 includes energy storage system 36, a motor 38, and a fuel cell 40. Specifically, in FIG. 2C, fuel cell 40 is disabled, as indicated by "X" 35. Thus, energy storage system 36 is the primary power source for motor 38, which is mechanically coupled to wheels 34. FIG. 2D illustrates an alternative configuration, wherein energy storage system 36 is disabled and fuel cell 40 operates as the primary power source for motor 38.

As described above, when controller 18 (FIG. 1) determines that there is an abnormal power source condition, signals are generated to disable the power source experiencing the abnormal condition. Accordingly, voice notification system 16 generates a voice message that alerts the driver as to the nature of the condition and that describes the operating limitations of vehicle 12.

It is recognized that FIGS. 2A-2D merely illustrate examples of various vehicle architectures in which the present invention is applicable. As such, the particular vehicle architecture may vary from those illustrated without departing from the scope of the present invention.

Figure 3:
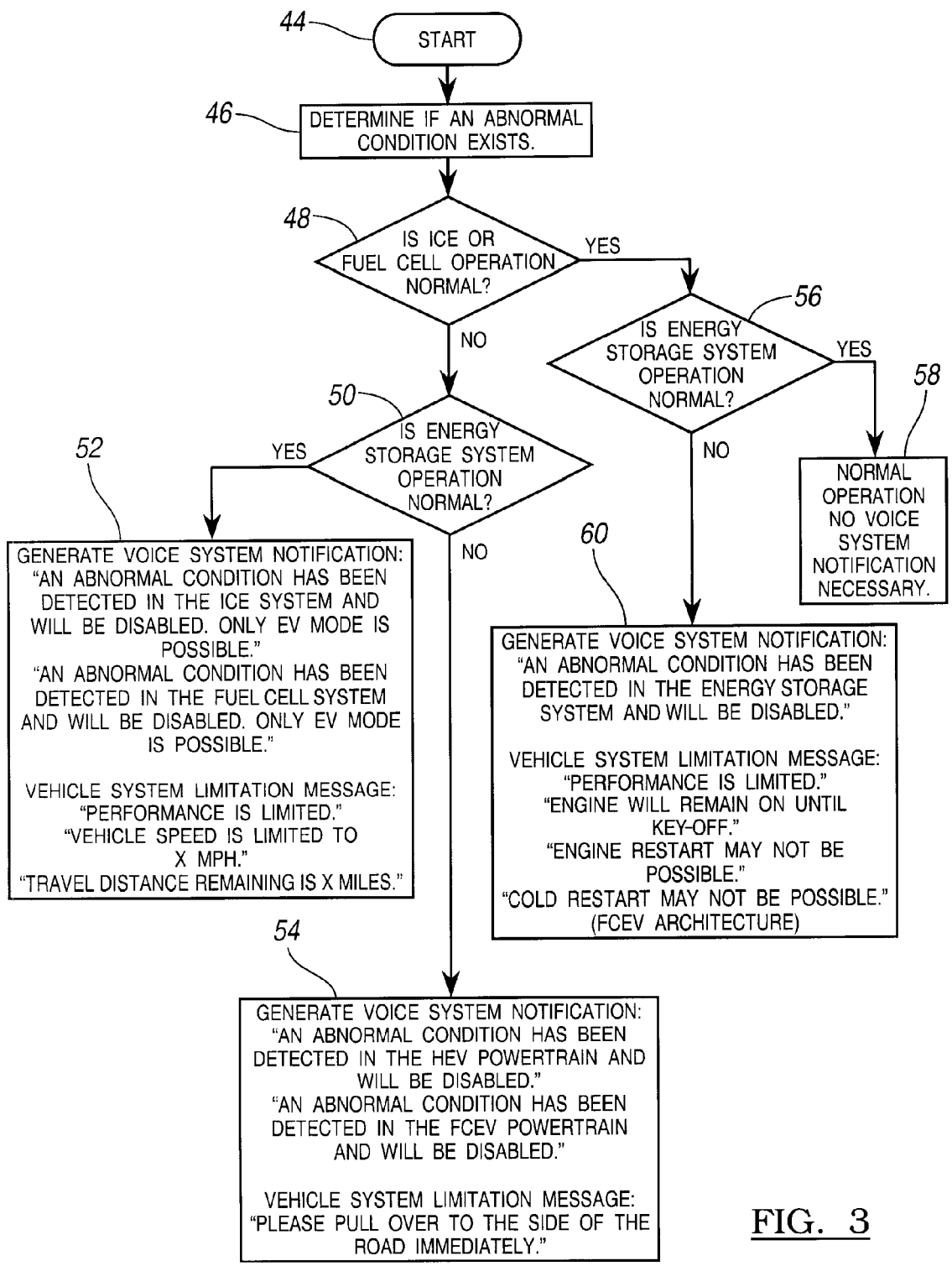
FIG. 3 illustrates a flow diagram of a method for providing an audible indication to a vehicle operator in accordance with an embodiment of the present invention.

Now referring to FIG. 3, a flow chart is illustrated of a method for notifying a vehicle operator of an abnormal power source or component condition. The method illustrated in FIG. 3 is applicable to virtually any vehicle having multiple power sources, such as a HEV or a FCEV. A step 44 is the entry point to the method. At a step 46, the method determines whether an abnormal condition exists. At step 46, the method is adapted to determine whether, for example, an internal combustion engine, a fuel cell, or an energy storage system (e.g., a battery) has experienced an abnormal condition. At a step 48, the method determines whether the internal combustion engine or, in an alternative embodiment, the fuel cell is functioning as expected. If either the internal combustion engine or the fuel cell is not functioning as expected, a step 50 occurs. At step 50, the method determines whether the energy storage system is functioning in a normal manner. As indicated by FIGS. 2A-2D, the electric drive system may be powered by energy storage system 36. Where the energy storage system is functioning normally, a step 52 occurs. At step 52, the method generates a voice system notification message and a vehicle system limitation message that are both audible by the vehicle operator. Accordingly, in one embodiment, the voice system notification message may include a message, such as "An abnormal condition has been detected in the ICE system and it will be disabled. Only Electric Vehicle mode is possible." The above voice system notification message is also customizable to other vehicle architectures such as a fuel cell vehicle. As such, the voice system notification message provides an indication of the operating state of the power source of the vehicle. Additionally, the vehicle system limitation message provides the vehicle operator with guidance on how to operate the vehicle while in the limited operating mode. As such, in one embodiment the vehicle system limitation message may include a statement, such as "Performance is limited. Vehicle speed is limited to 40 mph. Travel distance remaining is 3 miles." It is recognized, however, that the specific audible voice messages generated by the voice notification system may be modified without departing from the scope of the present invention.

Referring back to step 50, when an abnormal condition with respect to the energy storage system is detected, a step 54 occurs. At step 54, the voice notification system generates the voice system notification message and the vehicle system limitation message. The voice system notification message may include the following statement, "An abnormal condition has been detected in the HEV powertrain and it will be disabled." Accordingly, the vehicle system limitation message may include audible statements such as, "Please pull over to the side of the road immediately."

Now referring back to step 48, when the internal combustion engine or, alternatively, the fuel cell, is functioning normally, a step 56 occurs. At step 56, the method determines whether the energy storage system is functioning normally. If the energy storage system is functioning normally, a step 58 occurs, wherein the voice notification system is not activated. Where the energy storage system is functioning in accordance with an abnormal condition, a step 60 occurs. At step 60, the method generates a voice system notification message that may include a statement, such as "An abnormal condition has been detected in the energy storage system and it will be disabled." The voice notification system also generates a vehicle system limitation message that may include audible voice messages, such as "Performance is limited." The vehicle system limitation message may also include "Engine will remain on until key-off." The vehicle system limitation message may further include an audible statement, such as "Engine restart may not be possible." In the case of a FCEV, the vehicle system limitation message may include a voice message, such as "Cold restart may not be possible."

Accordingly, as described in the foregoing, the present invention informs the vehicle operator of a condition and announces the present vehicle limitations. As such, the operating mode and operating limitations of the vehicle are determined and an audible indication in the form of a voice message is generated for the vehicle operator.

While the best mode for carrying out the invention has been described in detail, those familiar with the art to which this invention relates will recognize various alternative designs and embodiments for practicing the invention as defined by the following claims.

What is claimed is:

1. A passive notification system for a vehicle having a plurality of power sources for propelling, at least in part, the vehicle, the system comprising:
   an audio device; and
   a controller operable with the plurality of power sources and being configured to determine operating modes of the plurality of power sources, the controller being adapted to generate signals that correspond to the current operating mode and operating limitations of at least one of the plurality of power sources of the vehicle to effect an audible indication in the form of a voice message that is output by the audio device, wherein the voice message includes a vehicle system limitation message for a vehicle operator.

2. A system according to claim 1, wherein the voice message also includes a voice system notification message.

3. A system according to claim 2, wherein the voice system notification message provides an indication of the state of at least one of the plurality of power sources.

4. A system according to claim 1, wherein the voice vehicle system limitation message includes an indication of a vehicle speed limitation or a vehicle travel distance limitation.

5. A system according to claim 1, wherein the voice vehicle system limitation message includes an indication of whether a vehicle cold restart is possible.

6. A system according to claim 1, wherein the plurality of power sources include a vehicle battery, an internal combustion engine, or a fuel cell.

7. A system according to claim 1, further comprising:
   a transmission; and
   a motor coupled to the transmission, wherein the transmission and the motor receive power from the plurality of power sources to enable movement of the vehicle.

8. A method of informing a vehicle operator of a vehicle operating condition, the method comprising:
   configuring the vehicle to include at least a first and a second power source;
   determining operating modes of the first and the second power source;
   determining operating limitations of the vehicle corresponding to the operating modes; and
   generating signals that correspond to the operating modes and operating limitations of the vehicle to effect an audible indication in the form of a voice message that includes a vehicle system limitation message for the vehicle operator.

9. A method according to claim 8, wherein generating signals that correspond to the operating modes and operating limitations of the vehicle to effect an audible indication in the form of a voice message also includes a voice system notification message.

10. A method according to claim 9, wherein the voice system notification message provides an indication of the state of the first or the second power source.

11. A method according to claim 8, wherein generating signals to effect a voice message that includes a vehicle system limitation message further includes a vehicle system limitation message that indicates a vehicle speed limitation or a vehicle travel distance limitation.

12. A method according to claim 8, wherein configuring the vehicle to include a first and a second power source includes a vehicle battery, an internal combustion engine, or a fuel cell.

13. A method according to claim 8, wherein generating signals to effect a voice message that includes a vehicle system limitation message further includes a vehicle system limitation message that indicates whether a vehicle cold restart is possible.

14. A method according to claim 8, further comprising configuring the vehicle to include:
   a transmission; and
   a motor coupled to the transmission, wherein the transmission and the motor receive power from the first and the second power sources to enable movement of the vehicle.

15. A method according to claim 8, further comprising configuring the vehicle to include a speaker for receiving the generated signals and outputting the audible indication.

* * * * *